(12) United States Patent
Mori

(10) Patent No.: US 6,376,023 B1
(45) Date of Patent: *Apr. 23, 2002

(54) TITANIUM OXIDE-CONTAINING MATERIAL AND PROCESS FOR PREPARING THE SAME

(75) Inventor: Takefumi Mori, Haguri-gun (JP)

(73) Assignees: Kyorasha Co., Ltd., Kyoto; Moritoshi Kabushikikaisha, Aichi, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/424,030

(22) PCT Filed: May 18, 1998

(86) PCT No.: PCT/JP98/02187

§ 371 Date: Nov. 17, 1999

§ 102(e) Date: Nov. 17, 1999

(87) PCT Pub. No.: WO98/52871

PCT Pub. Date: Nov. 26, 1998

(30) Foreign Application Priority Data

May 23, 1997 (JP) ............................................. 9-133924

(51) Int. Cl.$^7$ ................................................. B05D 1/18
(52) U.S. Cl. .................................. 427/430.1; 427/443.1
(58) Field of Search ................................. 428/432, 434, 428/472, 472.1, 469, 537.1, 537.7, 699, 701, 702; 427/189, 207.1, 437, 440, 443.1, 443.2, 523, 525, 430.1

(56) References Cited

U.S. PATENT DOCUMENTS 5,690,922 A * 11/1997 Mouri et al.
5,961,843 A * 10/1999 Hayakawa et al.
6,210,779 B1 * 4/2001 Watanabe et al.

FOREIGN PATENT DOCUMENTS

| JP | 60-65179 | 4/1985 |
|----|----------|--------|
| JP | 63-86205 | 4/1988 |
| JP | 1-93443 | 4/1989 |
| JP | 5-286738 | 11/1993 |
| JP | 6-240570 | 8/1994 |
| JP | 8-66635 | 3/1996 |

OTHER PUBLICATIONS

Chemical Treatments Designed to Modify the Affinity of Wool for Dyes. Bell, et al. JSDC vol. 100, Jul./Aug. 1984. 223–231.

* cited by examiner

Primary Examiner—Deborah Jones
Assistant Examiner—Jennifer McNeil
(74) Attorney, Agent, or Firm—Merchant & Gould PC

(57) ABSTRACT

A titanium oxide-containing material having a surface plated with titanium oxide. It is prepared by dissolving titanium fluoride (such as titanium tetrafluoride) in an amount of 2.0% owf in water, immersing a raw material in the obtained aqueous solution to treat the material with the aqueous solution at room temperature for 30 min, and adding a 0.5:1:1 (on a weight basis) mixture of boric acid, citric add, and DL-malic add in an amount of 0.5% owf to the aqueous solution to treat the material with the aqueous solution at 50° C. for 30 min, followed by washing with water. The raw materials usable herein include synthetic fibers, metals, glass, and woods, and may be in the form of sheet, plate, fiber, rod, or the like. Introduction of a noble metal, such as gold or silver, in addition to titanium oxide, onto the surface of the material enables the acceleration of the photocatalytic action of titanium oxide.

5 Claims, No Drawings

TITANIUM OXIDE-CONTAINING MATERIAL AND PROCESS FOR PREPARING THE SAME

TECHNICAL FIELD

The present invention relates to a titanium oxide-containing substrate that has various functions such as deodorizing, stain resisting (stain proofing or stain releasing), and antibacterial functions because of the photo-catalytic action of titanium oxide, and a process for preparing the same.

BACKGROUND ART

Conventionally, it is known that titanium oxide has a photo-catalytic action, by which it decomposes organic matters. The mechanism of decomposing organic matters by this photo-catalytic action is as follows: When titanium oxide is irradiated with light such as visible or ultraviolet rays, charge separation occurs, and electrons and highly oxidizable electron holes are formed. The electron holes react with water vapor or oxygen in air to form reaction active species such as OH radicals or $O_2^-$, which decompose organic matters that are present around them instantly. At present, titanium oxygen is used for environmental clean-up of deodorizing, stain resisting, and antibacterial treatments etc. by utilizing its photo-catalytic action.

However, although adhesives have been used for attaching titanium oxide to materials such as metals, glass, wood, or the like, there has been a problem that the adhesives are deteriorated by the photo-catalytic action of titanium oxide, so that the attached titanium oxide is peeled off. Furthermore, when titanium oxide is attached to a substrate formed from resins, synthetic fibers, or the like, it may be attached by mixing it in the substrate during the formation of the substrate, instead of using adhesives as mentioned above. It is herein noted that light such as visible or ultraviolet rays is required for causing the photo-catalytic action of titanium oxide, and moreover, it is necessary that titanium oxide exists on the surface of the substrate so that it may contact with an organic matter that is to be decomposed. However, according to the above-mentioned mixing method, it is difficult to attach titanium oxide on the surface of the substrate, and a large amount of titanium oxide should be mixed in the substrate so that titanium oxide may exist on the surface of the substrate in an amount required to develop various functions such as antibacterial, deodorizing, and stain resisting functions effectively. As a result, this method may affect properties of the substrate, and also is disadvantageous in terms of cost performance. Furthermore, when the substrate is formed from organic matters such as synthetic fibers, resins, or the like, the portion at which titanium oxide is attached is deteriorated, so that the titanium oxide may be peeled off.

Thus, it is an object of the present invention to provide a titanium oxide-containing substrate in which various functions such as deodorizing, stain resisting, and antibacterial functions due to the photo-catalytic action of titanium oxide are displayed sufficiently, and a process for preparing the same, by developing an effective means for attaching titanium oxide to a surface of a substrate, in which peeling of titanium oxide is prevented.

DISCLOSURE OF INVENTION

In order to achieve the above object, the present invention provides a titanium oxide-containing substrate having a surface plated with an anatase type titanium oxide film, the film being adhered to the surface of the substrate without being burned.

Thus, when the substrate has a surface plated with titanium oxide, even if the substrate is formed from organic matters, the portion at which titanium oxide is attached is not deteriorated by the photo-catalytic action of titanium oxide. Moreover, because the bonding strength of plating is large, titanium oxide is not peeled off. Furthermore, because a surface of the substrate is plated with titanium oxide, the photo-catalytic action of titanium oxide is displayed sufficiently, so that the substrate exhibits various functions such as excellent deodorizing, stain resisting, and antibacterial functions.

In the present invention, the surface of the substrate may be coated with titanium oxide completely, or may be coated partially. It is preferable that titanium oxide is attached to the surface of the substrate uniformly in a ratio of 1 to 10% (particularly a ratio of 2 to 5%) on an area basis.

In the titanium oxide-containing substrate of the present invention, it is preferable that the substrate is at least one selected from the group consisting of synthetic fibers, glass, metals, resins, and wood. Moreover, the substrate also may be formed from proteins, cellulose, or the like.

In the titanium oxide-containing substrate of the present invention, it is preferable that a noble metal is included in the titanium oxide film. This is because the photo-catalytic action of the titanium oxide is further accelerated by incorporating the noble metal, and also effects characteristic of the noble metal can be obtained. Furthermore, it is preferable that the noble metal is incorporated by plating as in the case of titanium oxide.

Furthermore, in the titanium oxide-containing substrate of the present invention, it is preferable that gold is included in the titanium oxide film, and a function of decomposing organic matters by oxidation is developed even in the absence of light.

Moreover, in the present invention, the titanium oxide and the noble metal in the substrate may be either ionic or non-ionic.

Next, the process for preparing the titanium oxide-containing substrate of the present invention comprises: adding a titanium fluoride in an aqueous solvent to prepare a solution; and bringing the solution into contact with a surface of a substrate while adding boric acid, malic add, and citric acid to the solution; whereby the surface of the substrate is plated with an anatase type titanium oxide film. It is preferable that the pH of the solution in which boric acid, malic acid, and citric acid are added is in the range of 3 to 5.

In the process for preparing the titanium oxide-containing substrate of the present invention, it is preferable that titanium tetrafluoride is used as the titanium fluoride because of its excellent reactivity.

In the process for preparing the titanium oxide-containing substrate of the present invention, it is preferable that at least one selected from the group consisting of synthetic fibers, glass, metals, resins, and wood is used as the substrate. Moreover, other than these materials, those materials as mentioned above also may be employed.

Because of the same reasons as mentioned above, in the process for preparing the titanium oxide-containing substrate of the present invention, it is preferable that a noble metal is incorporated in the titanium oxide film.

Moreover, in the present invention, the "substrate" includes substrates after being processed into products as well as substrates before being processed into products. Furthermore, it also includes substrates formed on a surface of other objects, such as coating films.

BEST MODE FOR CARRYING OUT THE INVENTION

The titanium oxide-containing substrate of the present invention is prepared, for example, as follows. In the following, "% owf" represents percentage by weight to the weight of the substrate to be treated. For example, 5% owf of an additive in the case of treating 3 kg of substrate indicates 150 g of the additive.

First, a substrate to be treated is prepared. The materials as mentioned above mentioned may be employed as this substrate. Furthermore, the shape of the substrate is not particularly limited, and it may be in the form of, e.g. fiber, plate, rod, or the like.

On the other hand, a titanium fluoride is added to an aqueous solvent to prepare a treating solution. Usually, water is used as the aqueous solvent. Furthermore, other than the above-mentioned titanium tetrafluoride, titanium trifluoride or the like also can be used as the titanium fluoride. In this case, the ratio of the titanium fluoride is usually from 0.1 to 5% owf, preferably about 2.0% owf. Moreover, by changing this ratio, the ratio of the titanium oxide introduced into the surface of the substrate can be adjusted.

Then, the treating solution is brought into contact with the surface of the substrate. When titanium oxide is introduced into a portion of the surface of the substrate, only that portion may come into contact with the solution. When titanium oxide is introduced into the entire surface of the substrate, the whole substrate may be immersed into the solution. Moreover, prior to this surface contacting treatment, it is preferable that the surface of the substrate is washed with water sufficiently.

Next, boric acid, malic acid, and citric acid are added to the treating solution. By adding these adds, an anatase type titanium oxide film is formed on the surface of the substrate. Moreover, although an anatase type titanium oxide film can be formed by adding only boric acid, by adding malic acid and citric acid as well, an anatase type titanium oxide film that is dense and has good adhesion is formed. The degree of adding the three types of acids is controlled so that the pH of the treating solution becomes in the range of 3 to 5.

The above treatment is usually carried out under conditions at a temperature of 20 to 50° C. and for 30 to 60 minutes, preferably at about 50° C. and for about 30 minutes.

When the surface of the substrate is plated with an anatase type titanium oxide film by such a process, the titanium oxide is not peeled off until the substrate is broken. Moreover, photo-catalytic reaction does not develop in a portion at which titanium oxide is attached to the substrate, but it develops at the interface between the titanium oxide exposed from the surface of the substrate and air, so that the strength of the attachment is not reduced by the photo-catalytic action of titanium oxide.

Thus, a titanium oxide-containing substrate is produced without using an adhesive or the like.

The ratio of the titanium oxide that is introduced onto the surface of the titanium oxide-containing substrate of the present invention is usually from 1 to 10%, preferably from 2 to 5% on an area basis. Furthermore, in the present invention, although the titanium oxide that is introduced onto the surface of the substrate is usually titanium dioxide, it also may be titanium monoxide or titanic trioxide. Furthermore, as a titanium dioxide, it is preferable to use an anatase-type that is excellent in photo-catalytic function. After being washed with water, the titanium oxide-containing substrate of the present invention can be processed into a desired product.

Furthermore, the method for introducing titanium oxide onto a surface of a substrate according to the present invention can be applied to a substrate that has been processed into a product. For example, it is possible that a garment is produced by processing a synthetic fiber, and the above-mentioned method of the present invention is applied to this garment. Furthermore, when a substrate that is formed from wood, metals, resins, or the like is coated with a paint, and the above-mentioned method of the present invention is applied thereto, the surface of the coating film is plated with titanium oxide.

As mentioned above, in the present invention, it is preferable that a noble metal is included in the titanium oxide film. In the following, combinations of titanium oxide and noble metals are described.

Titanium Oxide and Gold

By attaching gold as gold ions to a surface of a substrate, the reactivity of active oxygen generated by the photo-catalytic action of titanium oxide to organic matters can be increased. For example, when titanium oxide and gold are attached to a surface of a substrate in the ratio by weight of 1:0.001 of titanium oxide to gold, decomposition of contaminating organic matters such as tar of tobacco can be accelerated. Although the active oxygen generated by titanium oxide does not have selectivity in its reaction, by introducing gold ions, the active oxygen is allowed to react selectively with harmful substances contained in smoke of tobacco, which are partially ionized. Moreover, the ratio by weight of titanium oxide to gold on the surface of the substrate is usually from 100 to 10,000:1, preferably from 1000 to 2000:1.

Titanium Oxide and Silver

In theory, titanium oxide does not develop its photo-catalytic action without light. On the other hand, it is known that silver exhibits antibacterial and deodorizing actions under a condition without light and also exhibits almost no toxicity, so that it has been used traditionally as a material of antibacterial agents and deodorants. Thus, by attaching silver to a surface of a substrate in addition to titanium oxide, antibacterial and deodorizing properties are developed regardless to the presence or absence of light. Furthermore, because of the activity of silver, ozone can be produced using moisture and oxygen in the air, and thereby the photo-catalytic reaction of titanium oxide can be further accelerated. Moreover, the ratio by weight of titanium oxide to silver on the surface of the substrate is usually from 10 to 100:1, preferably from 50 to 60:1.

Titanium Oxide and Zirconium

Zirconium ion is a highly active ion having a coordination number of eight. By introducing zirconium ions onto a surface of a substrate along with titanium oxide, the photo-catalytic reaction of titanium oxide can be accelerated. Moreover, the ratio by weight of titanium oxide to zirconium on the surface of the substrate is usually from 10 to 20:1, preferably 10:1.

Other than the above-mentioned combinations, a combination such as that of titanium oxide, silica, and silver also may be employed. The common thing in all of these combinations of titanium oxide and noble metals is that the noble metals accelerate or stabilize the photo-catalytic action of titanium oxide.

The noble metals can be introduced onto the surface of the substrate in accordance with the method for introducing titanium oxide. That is, a compound of each noble metal is dissolved in water along with titanium fluoride. Examples of the compound of noble metal include chloroauric acid, silver nitrate, and zirconium acetate. Moreover, the ratio of the compound of a noble metal to be dissolved is adjusted so that the ratio of the noble metal on the surface of the substrate falls in the above-mentioned range. Moreover, in the same way as the above, by bringing this solution into contact with a surface of a substrate while adding boric acid, malic acid, and citric acid to the solution, titanium oxide and a noble metal can be deposited (plated) on the surface of the substrate. Moreover, it is presumed that a noble metal (particularly gold) is absorbed between the molecules of titanium oxide during the deposition.

In the following, examples of the present invention are described.

EXAMPLE 1

Titanium oxide was introduced into a synthetic fiber (type: polyester fiber) according to the following procedure to produce a titanium oxide-containing synthetic fiber.

First, titanium tetrafluoride was dissolved in water in an amount of 2.0% owf. The synthetic fiber was immersed into this aqueous solution, and treated at room temperature for 30 minutes. Then, a mixture of boric acid:citric acid:D,L-malic add in the ratio by weight of 0.5:1:1 was added to the aqueous solution in an amount of 0.5% owf, and treated at 50° C. for 30 minutes. At this time, the solution has a pH of 3. Then, it was washed with water, and a titanium oxide-containing synthetic fiber was obtained.

The thus obtained titanium oxide-containing synthetic fiber was investigated for its antibacterial, deodorizing, and stain resisting properties, and peeling degree of titanium oxide, according to the methods as follows.

Antibacterial Property

Antibacterial property was investigated by a Shake Flask method determined by Association of Antibacterial Treatments for Textiles, Japan, SEK. The test strains used were *Klebsiella pneumonise* IFP 13277and *Staphylococcus aureus* FDA 209P. Furthermore, as a control, the same test was carried out for an untreated polyester fiber. Moreover, the numerical values in Table 1 below are the average of bacterial numbers in three samples. Furthermore, in Table 1, the treated polyester fiber indicates the titanium oxide-containing polyester fiber of Example 1, and the untreated polyester fiber indicates a polyester fiber that has not been subjected to the above-mentioned treatment. This also applies to other tables.

TABLE 1

| Name of Sample | Right After Preparation | After Shaking for 1 hour | Sterilization Rate (%) |
|---|---|---|---|
| (Antibacterial Property) | | | |
| Name of Bacterium: *Klebsiella pneumonise* IFP 13277 | | | |
| Blank Test | $1.90 \times 10^4$ | $1.97 \times 10^4$ | −3.7 |
| Untreated Polyester Fiber | $1.90 \times 10^4$ | $1.60 \times 10^4$ | 15.8 |
| Treated Polyester Fiber | $1.90 \times 10^4$ | 50 | 99.7 |

TABLE 1-continued

| Name of Sample | Right After Preparation | After Shaking for 1 hour | Sterilization Rate (%) |
|---|---|---|---|
| (Antibacterial Property) | | | |
| Name of Bacterium: *Staphylococcus aureus* FDA 209P | | | |
| Blank Test | $1.64 \times 10^4$ | $1.75 \times 10^4$ | −6.7 |
| Untreated Polyester Fiber | $1.64 \times 10^4$ | $1.32 \times 10^4$ | 19.5 |
| Treated Polyester Fiber | $1.64 \times 10^4$ | 20 | 99.9 |

Deodorizing Property

Deodorizing property was investigated by a teddler-pack (Tedler-bag) method. That is, a 3000 ml capacity teddler pack was charged with ammonia, hydrogen sulfide, and acetic acid at predetermined concentrations, and further a sample was put therein, and the pack was sealed. The changes in the concentrations of the respective gases were measured at the initial time of the sealing, and at 5 minutes, 30 minutes, and 60 minutes after the sealing by a gas-tech detector (gas-detecting tube). Moreover, the measurement was carried out under light irradiation (10 centimeters below a 30 W fluorescent light).

TABLE 2

(Deodorizing Property)
Under light irradiation: 10 centimeters below a 30 W fluorescent light

| | Initial time (ppm) | 5 minutes (ppm) | 30 minutes (ppm) | 60 minutes (ppm) |
|---|---|---|---|---|
| Ammonia | 300 | 250 | 120 | 30 |
| Hydrogen Sulfide | 30 | 25 | 10 | 5 |
| Acetic Acid | 100 | 70 | 40 | 10 |

Stain Resisting Property

One gram of an instant coffee (Registered Trademark: NESCAFE GOLD BLEND, manufactured by Nestlé Japan Limited) and 1 g of dark soy sauce were added into 100 ml of water to prepare an artificaial contaminating liquid. A sample was immersed in this liquid, and then dried (Pad-Dry), so that a contaminated test sample was prepared. On the other hand, a sample that has not been treated with titanium oxide was immersed in the artificial contaminating liquid, and then died, to prepare a control. These samples were placed 10 centimeters below a 36 W fluorescent light, and exposed to the light for 20 hours. After that, deodorization rates of the samples were measured by a color-difference meter. And the initial color of the samples and the color of the samples after being exposed to the light for 20 hours were measured by a color-difference meter. The results are shown in Table 3 below.

TABLE 3

(Stain Resisting Property)
Under light irradiation: 10 centimeters below a 30 W fluorescent light, after being exposed to the light for 20 hours

| | Initial Color | Color after 20 hours |
|---|---|---|
| Untreated Polyester Fiber | 100 | 85 |
| Treated Polyester Fiber | 100 | 52 |

Peeling Degree of Titanium Oxide

Peeling degree of titanium oxide was measured under the conditions specified in JIS L 0217 103 (method using a household electric washing machine). That is, 50 g of a polyester fiber treated with titanium oxide was prepared, and the amount of titanium oxide in the polyester fiber was measured after 10 times and 20 times of washing. The amount of titanium oxide was determined by burning the titanium oxide-treated polyester fiber in an electric furnace at 1000° C. and determining the weight of the residue (titanium oxide). Then, peeling degree of titanium oxide was evaluated by a ratio (%) of the amount of titanium oxide after washing to the amount of titanium oxide before washing. The results are shown in Table 4 below. Moreover, in Table 4 the amount of titanium oxide attached is expressed by a ratio (%) to the total 50 g of the titanium oxide-treated polyester fiber.

TABLE 4

(Peeling Degree of Titanium Oxide)

| | Amount of Titanium Oxide Attached (%) | Peeling Degree (%) |
|---|---|---|
| Initial time | 0.52 | — |
| After 10 times of washing | 0.51 | 1.9 |
| After 20 times of washing | 0.48 | 7.7 |

According to the results of the above Tables 1 to 4, it is understood that the polyester fiber in which titanium oxide is incorporated was excellent in antibacterial, deodorizing, and stain resisting properties, and also that the peeling degree of the incorporated titanium oxide was extremely small.

EXAMPLE 2

Using stainless steel (20 cm$^2$) in place of the polyester fiber, titanium oxide was introduced onto the surface of she stainless steel by the same process as in Example 1. This stainless steel was investigated for its stain resisting and deodorizing properties according to the same methods as the above. The results are shown in Tables 5 and 6 below. Moreover, in Table 6 below, the treated stainless steel indicates the titanium oxide-containing stainless steel of Example 2, and the untreated stainless steel indicates a stainless steel that has not been treated with titanium oxide.

TABLE 5

(Deodorizing Property)
Under light irradiation: 10 centimeters below a 30 W fluorescent light

| | Initial time (ppm) | 5 minutes (ppm) | 30 minutes (ppm) | 60 minutes (ppm) |
|---|---|---|---|---|
| Ammonia | 300 | 250 | 120 | 30 |
| Hydrogen Sulfide | 30 | 25 | 10 | 5 |
| Acetic Acid | 100 | 70 | 40 | 10 |

TABLE 6

(Stain Resisting Property)
Under light irradiation: 10 centimeters below a 30 W fluorescent light, after being exposed to the light for 20 hours

| | Initial Color | Color after 20 hours |
|---|---|---|
| Untreated Stainless Steel | 100 | 85 |
| Treated Stainless Steel | 100 | 52 |

According to the results of the above Tables 5 and 6, it is understood that the stainless steel treated with titanium oxide was excellent in stain resisting and deodorizing properties. Furthermore, it also was confirmed that this stainless steel had an excellent antibacterial property, and also the peeling degree of titanium oxide was extremely small.

EXAMPLE 3

Using titanium oxide and gold, a polyester fiber was treated according to the following procedure. First, titanium ions were generated in a solution using titanium fluoride in the same way as the above. Furthermore, chloroauric acid (in the ratio by weight of 0.001 to the titanium oxide) was added to this solution, so that gold ions were generated as well as titanium ions. Then, in the same way as in Example 1, a mixture of boric acid, citric add, and D,L-malic acid (mixture ratio by weight of 0.5:1:1) was added into the solution. As a result, generated titanium oxide ions and gold ions are deposited on the surface of the polyester fiber, and bind to it strongly.

Then, the thus obtained polyester fiber treated with titanium oxide and gold was investigated for its antibacterial, deodorizing, and stain resisting properties by the above-mentioned methods. The results are shown in Tables 7, 8, and 9 below, respectively. Moreover, in these tables, the treated polyester fiber (or treated) indicates the polyester fiber treated with titanium oxide and gold of this example, and the untreated polyester fiber (or untreated) indicates a polyester fiber that has not been subjected to the above-mentioned treatment.

TABLE 7

(Antibacterial Property)

| Name of Sample | Right After Preparation | After Shaking for 1 hour | Sterilization Rate (%) |
|---|---|---|---|
| Name of Bacterium: *Klebsiella pneumonise* IFP 13277 | | | |
| Untreated Polyester Fiber | $1.90 \times 10^4$ | $1.97 \times 10^4$ | −6.4 |
| Treated Polyester Fiber | $1.90 \times 10^4$ | 50 | 99.7 |
| Name of Bacterium: *Staphylococcus aureus* FDA 209P | | | |
| Untreated Polyester Fiber | $1.64 \times 10^4$ | $1.75 \times 10^4$ | −6.7 |
| Treated Polyester Fiber | $1.64 \times 10^4$ | 20 | 99.9 |

TABLE 8

(Stain Resisting Property)
Under light irradiation: 10 centimeters below a 30 W fluorescent light, after being exposed to the light for 20 hours

| | Initial Color | Color after 20 hours |
|---|---|---|
| Untreated Polyester Fiber | 100 | 85 |
| Treated Polyester Fiber | 100 | 22 |

TABLE 9

(Deodorizing Property)

| | | Initial time | 5 minutes | 30 minutes | 60 minutes |
|---|---|---|---|---|---|
| Under light irradiation: 10 centimeters below a 30 W fluorescent light (ppm) | | | | | |
| Ammonia | Untreated | 300 | 280 | 240 | 200 |
| | Treated | 300 | 150 | 20 | 0 |
| Hydrogen Sulfide | Untreated | 30 | 30 | 29 | 29 |
| | Treated | 30 | 20 | 10 | 5 |

TABLE 9-continued (Deodorizing Property)

|  |  | Initial time | 5 minutes | 30 minutes | 60 minutes |
|---|---|---|---|---|---|
| Acetic Acid | Untreated | 100 | 70 | 55 | 40 |
|  | Treated | 100 | 20 | 10 | 0 |
| Under Darkness (ppm) | | | | | |
| Ammonia | Untreated | 300 | 280 | 240 | 200 |
|  | Treated | 300 | 170 | 40 | 0 |
| Hydrogen Sulfide | Untreated | 30 | 30 | 29 | 29 |
|  | Treated | 30 | 20 | 9 | 0 |
| Acetic Acid | Untreated | 100 | 70 | 55 | 40 |
|  | Treated | 100 | 20 | 0 | 0 |

According to the results of the above Tables 7, 8, and 9. it is understood that the polyester fiber in which gold was incorporated as well as titanium oxide was further excellent in antibacterial, deodorizing and stain resisting properties.

In addition, it was confirmed that peeling of titanium oxide and gold was so extremely small in this polyester fiber. Moreover, in evaluating the deodorizing property, decomposition of gases such as ammonia also was tested under darkness, and surprisingly, it was confirmed that the organic gases were decomposed even under darkness, i.e. under a condition without light such as visible or ultraviolet rays.

Example 4

Using stainless steel (20 cm$^2$) in place of the polyester fiber, titanium oxide and gold were introduced onto the surface of the stainless steel according to the same procedure as in Example 3. Then, this stainless steel was investigated for its deodorizing and stain resisting properties by the above-mentioned methods. The results are shown in Tables 10 and 11 below. In Table 11, the treated stainless steel indicates the stainless steel treated with titanium oxide and gold of this example, and the untreated stainless steel indicates stainless steel that has not been subjected to the above-mentioned treatment

TABLE 10

(Deodorizing Property)
Under light irradiation: 10 centimeters below a 30 W fluorescent light

|  | Initial time (ppm) | 5 minutes (ppm) | 30 minutes (ppm) | 60 minutes (ppm) |
|---|---|---|---|---|
| Ammonia | 300 | 200 | 80 | 10 |
| Hydrogen Sulfide | 30 | 15 | 5 | 0 |
| Acetic Acid | 100 | 40 | 10 | 0 |

TABLE 11

(Stain Resisting Property)

Under light irradiation: 10 centimeters below a 30 W fluorescent light, after being exposed to the light for 20 hours

|  | Initial Color | Color after 20 hours |
|---|---|---|
| Untreated Stainless Steel | 100 | 85 |
| Treated Stainless Steel | 100 | 30 |

According to the results of the above Tables 10 and 11, it is understood that the stainless steel on which gold was incorporated as well as titanium oxide was further excellent in deodorizing and stain resisting properties. Furthermore, it was confirmed that peeling of titanium oxide and gold was extremely small in this stainless steel, and also an excellent antibacterial property was observed.

INDUSTRIAL APPLICABILITY

As mentioned above, in the titanium oxide-containing substrate of the present invention, by plating a surface of the substrate with an anatase type titanium oxide film, the anatase type titanium oxide film is attached to the surface without causing peeling. Therefore, the titanium oxide-containing substrate of the present invention is provided with various functions such as antibacterial, deodorizing, and stain resisting functions because of the excellent photo-catalytic action of titanium oxide. Furthermore, because titanium oxide develops photo-atalytic action by absorbing light such as ultraviolet rays, the titanium oxide-containing substrate of the present invention also has an effect of inhibiting ultraviolet rays (so-called UV cut effect). Furthermore, in the titanium oxide-containing substrate of the present invention, because titanium oxide also has a masking effect, the base color of the substrate can be masked by controlling the incorporating rate of titanium oxide. Moreover, a bright pure-white color can be attained using a titanium white, which is an excellent white pigment. Furthermore, by incorporating a noble metal in addition to titanium oxide, the photo-catalytic function of titanium oxide can be further enhanced, and also various functions of the noble metal can be provided to the substrate.

What is claimed is:

1. A process for plating a surface of a substrate with an anatase titanium oxide film, comprising:

adding a titanium fluoride in an aqueous solvent to prepare a solution; and bringing the solution into contact with the surface of the substrate while adding boric acid, malic acid, and citric acid to the solution.

2. The process of plating a surface of a substrate with an anatase titanium oxide film according to claim 1, wherein the titanium fluoride is titanium tetrafluoride.

3. The process of plating a surface of a substrate with an anatase titanium oxide film according to claim 1, wherein the substrate is at least one selected from the group consisting of synthetic fibers, glass, metals, resins and wood.

4. The process of plating a surface of a substrate with an anatase titanium oxide film according to claim 1, wherein a noble metal is incorporated in the titanium oxide film.

5. The process of plating a surface of a substrate with an anatase titanium oxide film according to claim 1, wherein a pH of the solution after boric acid, malic acid, and citric acid are added is in the range of 3 to 5.

* * * * *